United States Patent
Brackett et al.

(10) Patent No.: US 11,617,347 B2
(45) Date of Patent: Apr. 4, 2023

(54) ANIMAL SCRATCHING POST WITH FOOD DISPENSER

(71) Applicants: Constance Brackett, Centennial, CO (US); Angela Santopietro, Aurora, CO (US)

(72) Inventors: Constance Brackett, Centennial, CO (US); Angela Santopietro, Aurora, CO (US)

(*) Notice: Subject to any disclaimer, the term of this patent is extended or adjusted under 35 U.S.C. 154(b) by 86 days.

(21) Appl. No.: 17/198,968

(22) Filed: Mar. 11, 2021

(65) Prior Publication Data

US 2021/0282368 A1    Sep. 16, 2021

Related U.S. Application Data

(60) Provisional application No. 62/988,096, filed on Mar. 11, 2020.

(51) Int. Cl.
*A01K 5/02* (2006.01)
*A01K 15/02* (2006.01)

(52) U.S. Cl.
CPC .......... *A01K 5/0291* (2013.01); *A01K 15/024* (2013.01)

(58) Field of Classification Search
CPC ...... A01K 5/0921; A01K 5/02; A01K 5/0275; A01K 15/024; A01K 13/003; A01K 5/0291; A01K 5/00
USPC ............................................ 119/51.02, 51.11
See application file for complete search history.

(56) References Cited

U.S. PATENT DOCUMENTS

| | | | |
|---|---|---|---|
| 5,113,795 A | 5/1992 | Delzio | |
| 5,133,292 A * | 7/1992 | Kirk | A01K 61/85 119/51.13 |
| 5,176,103 A * | 1/1993 | Reid | A01K 5/0291 119/51.13 |
| 6,273,027 B1 | 8/2001 | Watson | |
| 6,345,593 B1 * | 2/2002 | Stewart | A01K 15/024 119/706 |
| 6,349,671 B1 * | 2/2002 | Lewis | A01K 5/025 119/51.02 |

(Continued)

FOREIGN PATENT DOCUMENTS

| | | | | |
|---|---|---|---|---|
| FR | 2670989 A1 | * | 7/1992 | ........... A01K 15/024 |
| WO | WO-9200666 A | * | 1/1992 | ........... A01K 15/024 |

OTHER PUBLICATIONS

Petlibro Automatic Feeders for Cats, Available on Amazon.com at (https://www.amazon.com/dp/B0854HDNHN?ref_=cm_sw_r_apin_dp_JR3FDFT4AEMTPQM773AT&th=1) (Year: 2020).*

(Continued)

*Primary Examiner* — Timothy D Collins
*Assistant Examiner* — Maria E Graber
(74) *Attorney, Agent, or Firm* — Diederiks & Whitelaw, PLC.

(57) ABSTRACT

An animal scratching post with food dispenser is described. Embodiments of the animal scratching post can include, but are not limited to, a base structure, a control module, an activation module, a food dispensing device, and one or more scratch pads operatively connected to the activation module. The base structure can include one or more perches and an internally located conduit for delivering food from the food dispensing device to a lower section of the base structure. The control module can be configured to receive a signal from the activation module indicating the scratch pad has been interacted with by an animal and send a signal to the food dispensing device to dispense food.

14 Claims, 7 Drawing Sheets

(56) References Cited

U.S. PATENT DOCUMENTS

| | | | | |
|---|---|---|---|---|
| 6,666,167 | B1* | 12/2003 | Carlson | A01K 15/024 |
| | | | | 119/706 |
| 6,766,766 | B1* | 7/2004 | Elliott | A01K 1/0107 |
| | | | | 119/57.92 |
| 9,491,928 | B1* | 11/2016 | Mills | A01K 15/024 |
| 2008/0060582 | A1 | 3/2008 | Painter | |
| 2008/0289580 | A1* | 11/2008 | Krishnamurthy | A01K 5/0291 |
| | | | | 119/51.11 |
| 2012/0060761 | A1* | 3/2012 | Laro | A01K 5/0291 |
| | | | | 340/392.1 |
| 2016/0007564 | A1* | 1/2016 | Ma | A01K 5/0291 |
| | | | | 119/57.1 |
| 2017/0202181 | A1* | 7/2017 | Hartelius | A01K 15/024 |
| 2017/0238503 | A1* | 8/2017 | Deritis | A01K 5/0275 |
| 2019/0246605 | A1* | 8/2019 | Chen | A01K 15/025 |
| 2020/0037579 | A1* | 2/2020 | Eom | A01K 5/025 |
| 2020/0367469 | A1* | 11/2020 | Zhu | A01K 5/0291 |
| 2020/0396959 | A1* | 12/2020 | Bahr | A01K 5/0291 |
| 2021/0176957 | A1* | 6/2021 | List | A01K 5/0114 |
| 2022/0022417 | A1* | 1/2022 | Petersen | A01K 15/021 |

OTHER PUBLICATIONS

YouTube Video Smart Cat Prepares Herself Coffee (https://www.youtube.com/shorts/2cShFvWftCw) (Year: 2022).*

* cited by examiner

ANIMAL SCRATCHING POST WITH FOOD DISPENSER

CROSS-REFERENCE TO RELATED APPLICATION

This application claims the benefit of U.S. Provisional Application No. 62/988,096, filed Mar. 11, 2020.

BACKGROUND

Currently available means to help keep cats (or other animals) from scratching furniture in a home include scratching posts. Scratching posts can be presented to a cat as an alternative to scratching a couch, chairs, etc. However, there is no guarantee that the animal will continuously use the scratching post in lieu of other objects. To help train an animal to use a scratching post, it is generally known to reward the animal with treats for using the scratching post. For example, to distribute treats to a cat, current scratch pads are configured to be activated via an animal scratching a scratch pad. The scratching action by an animal operates an adjustable valve located inside a food hopper that distributes food to the animal. The adjustable valve allows a user to control the amount of food provided in each actuation of the valve. However, the animal can continuously scratch the scratch pad and food will continuously be dispensed. Stated alternatively, every time the animal scratches the pad, food will be dispensed.

Another currently available cat scratching post feeder implements a spring-loaded door that is opened when a cat scratches an exterior scratching pad. When the spring-loaded door is opened, food is released. However, this device does not limit the amount of food (or treats) that are dispensed as a cat may continually scratch the cat scratching post feeder and receive food. More succinctly, every time a cat scratches the scratch pad, food will be dispensed.

An animal scratching post that can reward an animal for interacting with the scratching post, along with modulating an amount of food dispensed based on behavior of an animal is needed.

DETAILED DESCRIPTION

Figure 1:
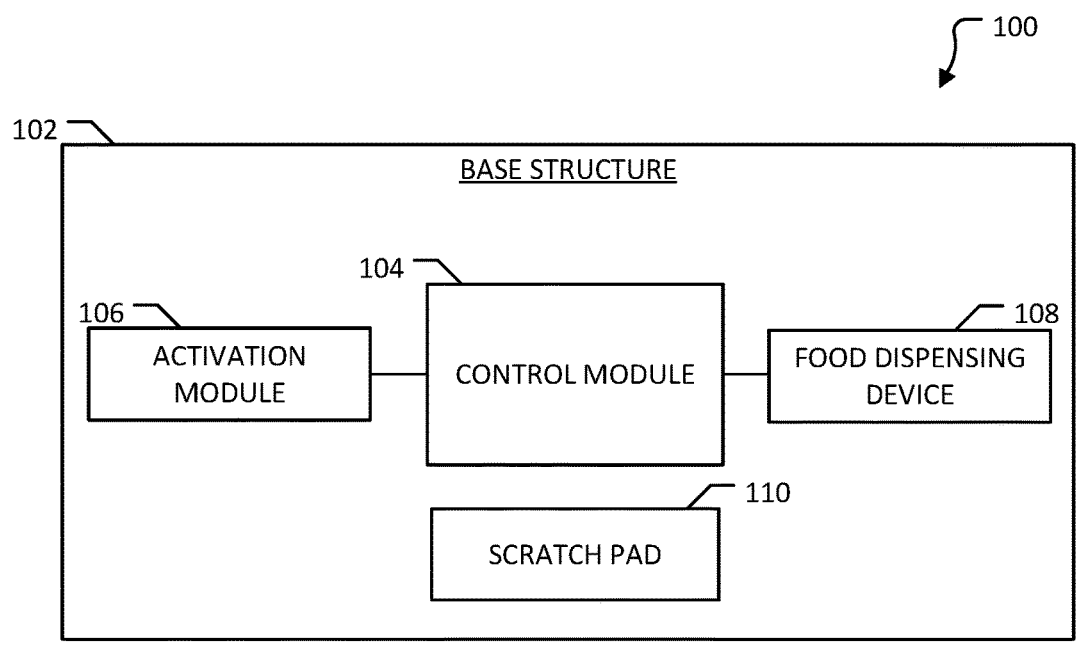
FIG. 1 is a block diagram of an animal scratching post according to one embodiment of the present invention.

Embodiments of the present invention can include an animal scratching post configured to dispense food when a cat (or other animal) scratches a pad of the post. Although a cat is mentioned often, it is to be appreciated that the animal scratching post is not limited to cats. Embodiments of the animal scratching post can be implemented to reward an animal for using a scratch pad of the animal scratching post. In one instance, a sensor (e.g., pressure sensor) can be implemented to detect when a cat scratches the scratch pad. A control module can be implemented to receive a signal from the sensor and determine when to dispense a treat based on receiving the signal. For instance, the control module may only send a signal to a food dispensing device after a predetermined number of detections by the sensor. For example, if the control module receives a signal from the sensor multiple times within a predefined amount of time (e.g., 10 secs), the control module may then send a signal to the food dispensing device to dispense a treat. As can be appreciated, by setting parameters the animal must meet in order to get a treat, the animal will not be rewarded every time they scratch the post, as is currently available.

In one embodiment, the control module can include, but is not limited to, a processor, random-access memory, storage, and at least one input for the sensor. In some embodiments, the control module may be programmable to allow a user to determine how often a treat is dispensed or to change parameters. In another embodiment, the control module can be a printed circuit board operatively connected to a food dispensing device and an activation module. The activation module can be configured to determine when an animal interfaces (e.g., scratches) a scratch pad of the animal scratching post.

Typically, the animal scratching post can include, but is not limited to, a base structure, a control module, an activation module (e.g., pressure sensor), a food dispensing device, and a scratch pad. In one instance, the control module, the activation module, and the food dispensing device can be located within the base structure. It is to be appreciated that one or more components can be located outside of the base structure. The scratch pad can be removably coupled to an exterior of the base structure. The control module can be operatively connected to the activation module and the food dispensing device.

In a typical implementation, the control module can receive a signal from the activation module and determine when to send a signal to the food dispensing device to dispense a treat. In one instance, when the control module receives a signal from the activation module indicating that the scratching pad has been scratched by an animal, the control module can send a signal to the food dispensing device to dispense a predetermined amount of food to the animal. As previously mentioned, the control module can include one or more parameters for determining when to dispense food. This can help ensure that an animal does not continuously get food each time the scratching pad is scratched and/or too much food. The control module can be implemented to determine when and how often an animal can get food from the animal scratching post.

In one embodiment, the food dispensing device may include a wheel having one or more receptacles and a motor configured to rotate the wheel. The control module may activate the motor to rotate the wheel when the activation module detects a scratch. In one instance, the wheel may rotate a predetermined distance corresponding to a width of an opening of the receptacle. As the wheel rotates, the predetermined amount of food can be rotated with each scratch detection inside the receptacle. Once the receptacle rotates to an opening in the food dispensing device, the food can be deposited and the wheel can continue to rotate as the cat scratches the scratch pad. Of note, by providing a wheel, treats can be metered via the receptacles and a predetermined number of scratch detections corresponding to a number of scratches before the treats are dispensed.

A variety of different types of activation modules are contemplated to be used with the animal scratching post. In one example, a pressure sensor can be implemented to detect when a cat presses against the scratch pad. In such an embodiment, the pressure sensor may be calibrated to a certain pressure level to indicate that the cat has scratched the scratch pad. The control module may be configured to only send a signal to the food dispensing device when a certain pressure has been detected or when a certain number of pressure detections have been made within a predefined amount of time. In another example, a photodetector may be implemented. An opening in the scratch pad may be placed proximate a fixed location of the photodetector. The scratch pad can be configured to move up and down with the scratch pad biased towards an up position. When a cat scratches the scratch pad, and thus moves the scratch pad down, the photodetector may be covered, thus detecting a scratch and sending a signal to the control module. In yet another example, a momentary switch can be implemented. In such an embodiment, the momentary switch can be operatively connected to the scratch pad such that the switch can be turned "on" when an animal scratches the scratch pad and a signal can be sent to the control module.

In one embodiment, an animal scratching post can include, but is not limited to, a base structure, an activation module, a food dispensing device, and a control module. The base structure can include a base, a post extending up from the base where a first end of the post can be coupled to the base and can include an aperture located proximate the base, a first perch, a second perch located proximate a second end of the post, and a pair of scratch pads coupled to sides of the post. The activation module can be operatively connected to the pair of scratch pads. The food dispensing device can be connected with the aperture. The control module can be adapted to determine when the food dispensing device dispenses food based on the activation module. The food dispensing device can be removably coupled to the second perch. The food dispensing device can include a motor assembly and a plurality of receptacles. The plurality of receptacles can form a wheel adapted to be rotated by the motor assembly. The activation module can send a signal to the control module in response to an animal scratching one of the pair of scratch pads. The control module can activate the motor assembly after receiving a predetermined number of signals from the activation module within a predetermined amount of time. The control module can activate the motor assembly after receiving a first signal from the activation module and the control module can be adapted to ignore successive signals from the activation module for a predetermined amount of time. The first perch and the second perch each include a pad. The food dispensing device can be magnetically coupled to a bottom side of the second perch. The activation module can be a pressure sensor. The activation module can be a momentary switch.

In another embodiment, an animal scratching post can include, but is not limited to, a food dispensing device, an activation module, a control module, and a base structure. The control module can be operatively connected to the food dispensing device and the activation module. The base structure can include a base, a post, a first perch, a second perch, and a pair of scratch pads located proximate sides of the post. The control module activates the food dispensing device to dispense food after receiving a first signal from the activation module, the control module adapted to ignore successive signals from the activation module for a predetermined amount of time. The food dispensing device can be defined by a mounting plate, a motor assembly, and a plurality of receptacles forming a wheel. The mounting plate can include an aperture, a plurality of protrusions, and a coupling mechanism. The wheel can be operatively connected to the motor assembly and adapted to pass over the mounting plate aperture. The mounting plate aperture can be located proximate a top opening of the post. The base structure can further include a conduit running from the food dispensing device aperture to an opening in the post. The control module can activate the food dispensing device after (i) the predetermined amount of time, and (ii) receiving another signal from the activation module. The activation module can include a first sensor operatively coupled to a first scratch pad of the pair of scratch pads, and a second sensor operatively coupled to a second scratch pad of the pair of scratch pads. The activation module can send a signal to the control module based on the first sensor detecting the first scratch pad being interacted with by an animal. The activation module can send a signal to the control module based on the second sensor detecting the second scratch pad being interacted with by an animal.

In yet another embodiment, an animal scratching post can include, but is not limited to, a food dispensing device, an activation module, a control module, and a base structure. The food dispensing device can be defined by a mounting plate, a motor assembly, and a plurality of receptacles. The mounting plate can include an aperture, a plurality of protrusions, and a coupling mechanism. The plurality of receptacles forming a wheel where the wheel can be operatively connected to the motor assembly and adapted to pass over the aperture. The activation module can include a first sensor operatively coupled to a first scratch pad of the pair of scratch pads and a second sensor operatively coupled to a second scratch pad of the pair of scratch pads. The control module can be operatively connected to the food dispensing device and the activation module. The base structure can include a base, a post, a first perch, a second perch, and a pair of scratch pads located proximate sides of the post. The activation module can send a signal to the control module based on the first sensor detecting the first scratch pad being interacted with by an animal or the second sensor detecting the second scratch pad being interacted with by the animal. The control module can activate the food dispensing device to dispense food after receiving a first signal from the activation module. The control module can be adapted to ignore successive signals from the activation module for a predetermined amount of time.

The present invention can be embodied as devices, systems, methods, and/or computer program products. Accordingly, the present invention can be embodied in hardware and/or in software (including firmware, resident software, micro-code, etc.). Furthermore, the present invention can take the form of a computer program product on a computer-usable or computer-readable storage medium having computer-usable or computer-readable program code embodied in the medium for use by or in connection with an instruction execution system. In one embodiment, the present invention can be embodied as non-transitory computer-readable media. In the context of this document, a computer-usable or computer-readable medium can include, but is not limited to, any medium that can contain, store, communicate, propagate, or transport the program for use by or in connection with the instruction execution system, apparatus, or device.

The computer-usable or computer-readable medium can be, but is not limited to, an electronic, magnetic, optical, electromagnetic, infrared, or semiconductor system, apparatus, device, or propagation medium.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

The term "software," as used in this specification and the appended claims, refers to programs, procedures, rules, instructions, and any associated documentation pertaining to the operation of a system.

The term "firmware," as used in this specification and the appended claims, refers to computer programs, procedures, rules, instructions, and any associated documentation contained permanently in a hardware device and can also be flashware.

The term "hardware," as used in this specification and the appended claims, refers to the physical, electrical, and mechanical parts of a system.

The terms "computer-usable medium" or "computer-readable medium," as used in this specification and the appended claims, refers to any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

The term "signal," as used in this specification and the appended claims, refers to a signal that has one or more of its characteristics set or changed in such a manner as to encode information in the signal. It is to be appreciated that wireless means of sending signals can be implemented including, but not limited to, Bluetooth, Wi-Fi, acoustic, RF, infrared and other wireless means.

A First Embodiment of Animal Scratching Post with Food Dispenser

Referring to FIG. 1, a block diagram of a first embodiment 100 of an animal scratching post adapted to selectively dispense food is illustrated. The animal scratching post 100 can be implemented to reward a cat for engaging with a scratch pad of the animal scratching post 100. Typically, treats can be provided to the cat based on interactions with the scratching pad by the cat.

As shown in FIG. 1, the animal scratching post 100 can include, but is not limited to, a base structure 102, a control module 104, an activation module 106, a food dispensing device 108, and one or more scratch pads 110. Typically, the control module 104 can activate the food dispensing device 108 in response to receiving a signal from the activation module 106. The control module 104 can be configured to determine when to activate the food dispensing device 108 based on one or more predefined parameters. The activation module 106 can be connected to the control module 104. Typically, the activation module 106 can include a sensor for each of the scratch pads 110. The food dispensing device 108 can be operatively connected to the control module 104. In one embodiment, the scratch pads 110 may each be a sisal scratch pad. In another embodiment, the scratch pads 110 may each be different types of scratch pads.

Figure 2E:
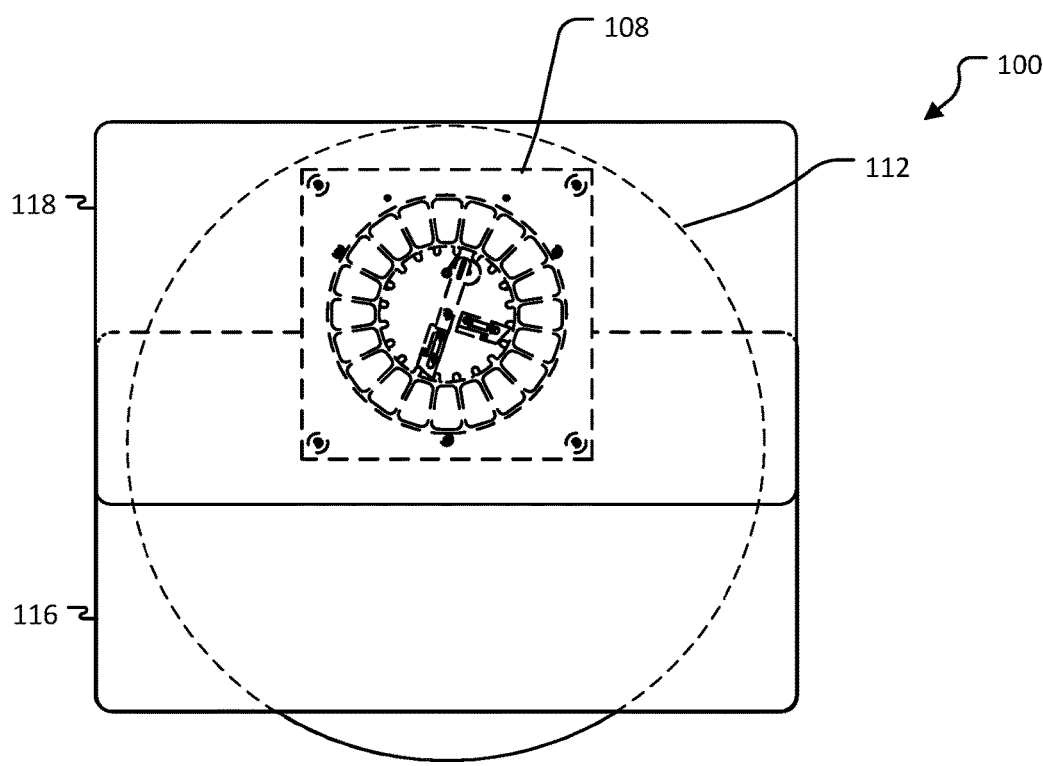
FIG. 2E is a top view of an animal scratching post according to one embodiment of the present invention.
Figure 2A:
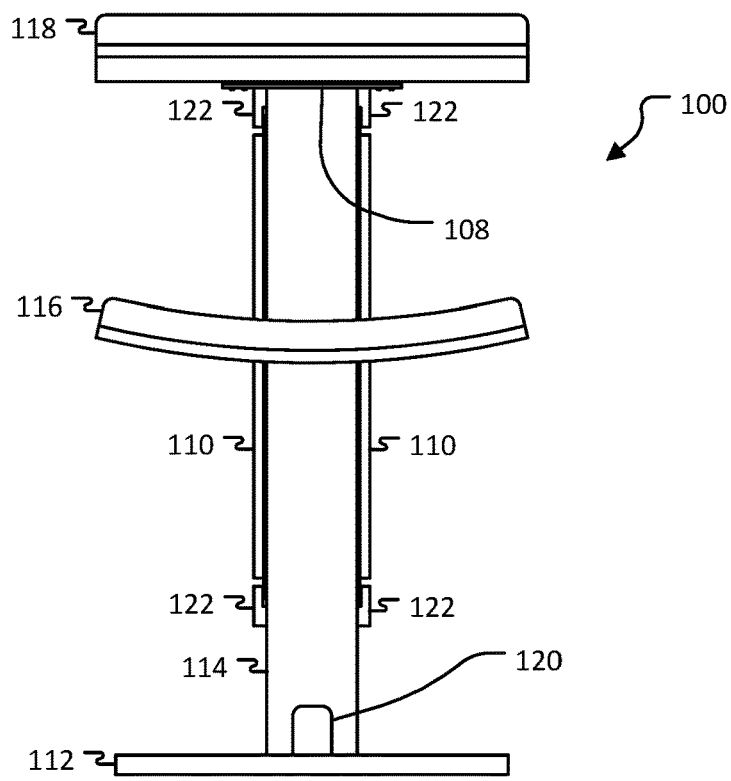
FIG. 2A is a front view of an animal scratching post according to one embodiment of the present invention.
Figure 2B:
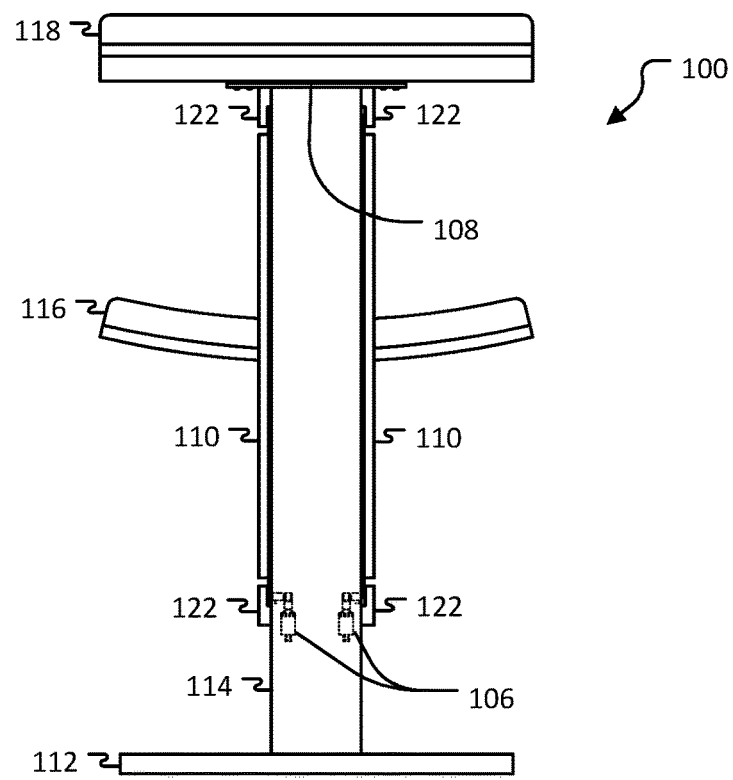
FIG. 2B is a back view of an animal scratching post according to one embodiment of the present invention.
Figure 2C:
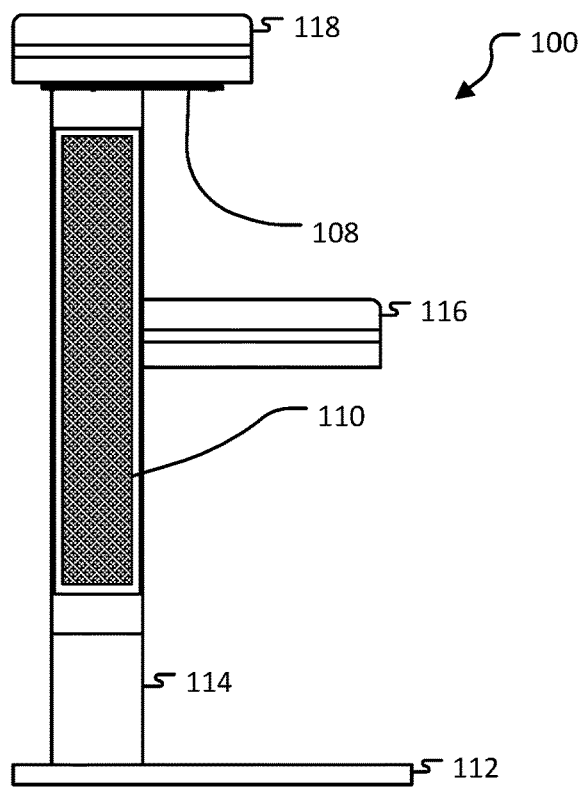
FIG. 2C is a left, side view of an animal scratching post according to one embodiment of the present invention.
Figure 2D:
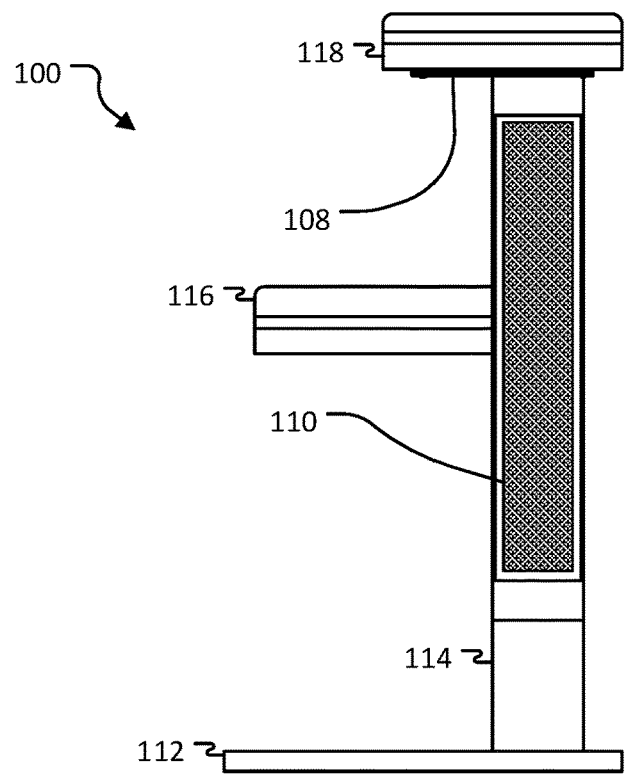
FIG. 2D is a right, side view of an animal scratching post according to one embodiment of the present invention.
Figure 2F:
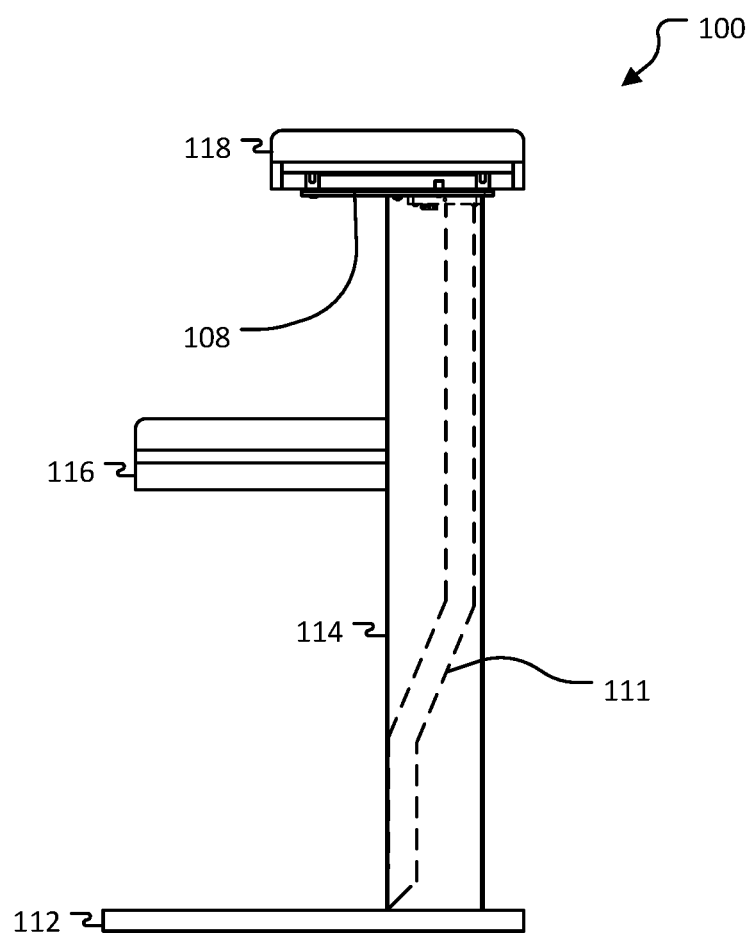
FIG. 2F is a right, side view of an animal scratching post according to one embodiment of the present invention.

Referring to FIGS. 2A-2F, various views of the animal scratching post 100 are illustrated. FIG. 2A includes a front view of the animal scratching post 100. FIG. 2B includes a back view of the animal scratching post 100. FIG. 2C includes a left, side view of the animal scratching post 100. FIG. 2D includes a right, side view of the animal scratching post 100. FIG. 2E includes a top view of the animal scratching post 100. FIG. 2F includes a right, side view of the animal scratching post 100 with the scratching pads 110 removed and showing a conduit (or guide) 111 from the food dispensing device 108 to an opening in the animal scratching post.

As shown, the base structure 102 can include a base 112, a post 114, a first perch 116, and a second perch 118. The base structure 102 can include the conduit 111 to allow treats dispensed from the food dispensing device 108 to fall to the base 112. Typically, the base 112 can be weighted to ensure that the animal scratching post 100 does not tip over when a cat is interacting with the animal scratching post 100. In one instance, the base 112 can have a substantially circular shape. It is to be appreciated that the base 112 can have different shapes without exceeding a scope of the present invention. As generally shown, the food dispensing device 108 can be located on an underside of the second perch 118. One example of the activation module 106 is shown in FIG. 2B. As shown, the activation module 106 can include a pair of sensors. The pair of sensors (as shown) can be operatively connected to the scratching pads 110. For instance, a first sensor can be operatively connected to a first scratching pad and a second sensor can be operatively connected to a second scratching pad. Of note, when the scratch pads 110 are scratched, the activation module 106 can be adapted to detect the scratching and send a signal to the control module 104.

The post 114 can be secured to the base 112 and can extend upwardly from the base 112. The first perch 116 can be secured to a front side of the post 114 and provide a surface for an animal to rest. The second perch 118 can be coupled to a top of the post 114. The food dispensing device 108 can typically be located between a bottom side of the second perch 118 and a top of the post 114. In some embodiments, one or both of the perches 116, 118 may not be included. The perches 116, 118 can each include a removable pad for an animal to rest on. As shown in FIG. 2A, proximate a front bottom of the post 114, the post 114 can include an aperture 120 through which food can be deposited onto the base 112. Typically, the aperture 120 can be operatively connected to the food dispensing device 108 via the conduit 111.

The post 114 can further include guides 122 located on each side and proximate a top and a bottom of the post for interfacing with and receiving the scratch pads 110. Of note, the guides 122 can be implemented to removably couple the scratch pads 110 to the post 114. As shown in FIG. 2B, the activation module 106 can be located inside the post 114 and proximate a bottom of the scratch pads 110. Although the guides 122 are shown located on each side of the post 114, embodiments are contemplated where a scratch pad can be located on a front or back side of the post 114.

As shown in FIG. 2F, the conduit 111 can be implemented to take treats dispensed by the food dispensing device 108 to the aperture 120 in the post 114. As can be appreciated, the food can fall down the conduit 111 and exit the post 114 via the post aperture 120. The food can be deposited onto a top of the base 112. As will be discussed hereinafter, the food dispensing device 108 can include an aperture through which food can exit the food dispensing device 108. The aperture of the food dispensing device 108 can be aligned with the conduit 111. In one instance, the conduit 111 can be a pipe. In another instance, the conduit 111 can be a slide on which the food can be directed to the post aperture 120.

Figure 3A:
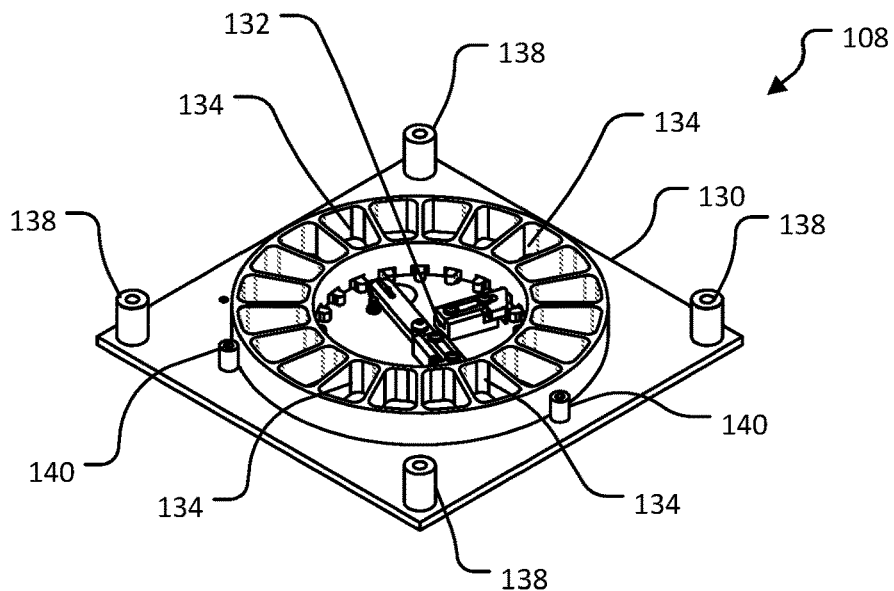
FIG. 3A is a top perspective view of a food dispensing device according to one embodiment of the present invention.
Figure 3B:
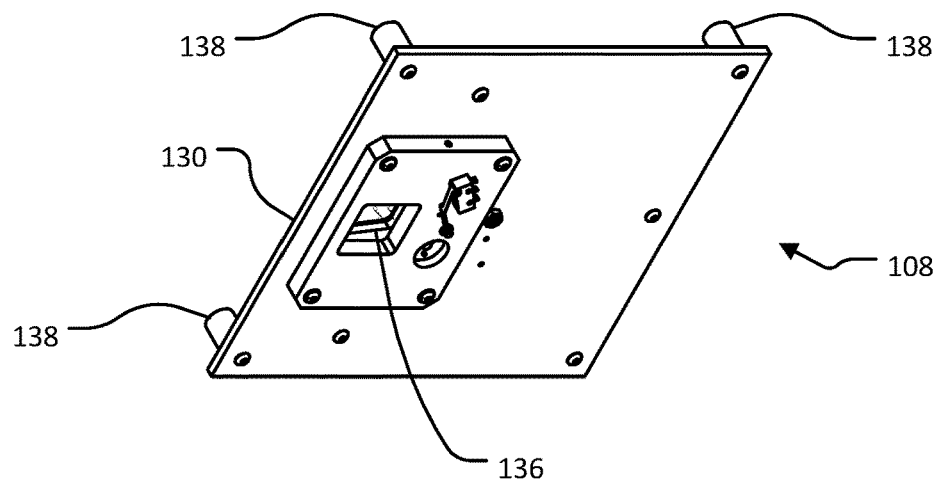
FIG. 3B is a bottom perspective view of a food dispensing device according to one embodiment of the present invention.
Figure 3C:
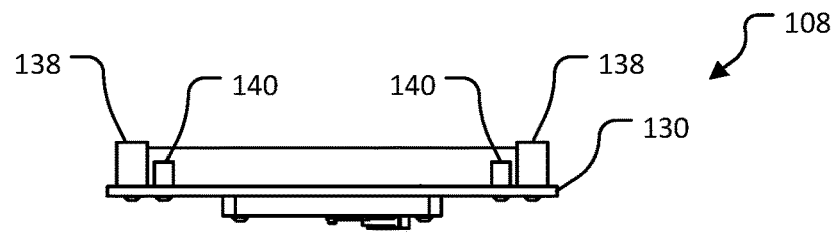
FIG. 3C is a front view of a food dispensing device according to one embodiment of the present invention.

Referring to FIGS. 3A-3C, various views of one example embodiment of the food dispensing device 108 are illustrated. FIG. 3A includes a top perspective view of the food dispensing device 108. FIG. 3B includes a bottom perspective view of the food dispensing device 108. FIG. 3C includes a front view of the food dispensing device 108.

As shown generally, the food dispensing device 108 can include, but is not limited to, a mounting plate 130, a motor assembly 132, a plurality of receptacles 134, an aperture 136, a plurality of protrusions 138, and a coupling mechanism 140. As previously mentioned, the food dispensing device 108 can be coupled to a bottom of the second perch 118. The plurality of protrusions 138 can be implemented to locate the food dispensing device 108 with the second perch 118 and the coupling mechanism 140 can be implemented to removably secure the food dispensing device 108 to the second perch 118. In one instance, the coupling mechanism 140 can implement magnets located on the food dispensing device 108 to magnetically couple to magnets located on a bottom of the second perch 118.

The motor assembly 132 can be operatively connected the control module 104. When the control module 104 sends a signal to the motor assembly 132, the motor assembly 132 can be configured to rotate the plurality of receptacles 134. The receptacles 134 can be sized to store food to be dispensed to an animal. Of note, as the motor assembly 132 rotates the plurality of receptacles 134, food located in a receptacle that stops over the aperture 136 can be dispensed to a bottom of the post 114 and onto the base 112 via the conduit 111.

In one embodiment, the plurality of receptacles 134 can be formed into a wheel with the motor assembly 132 configured to rotate the wheel. The control module 104 may activate the motor assembly 134 to rotate the wheel when the activation module 106 detects a scratch. In one instance, the wheel may rotate a predetermined distance corresponding to a width of an opening of one of the receptacles 134. As the wheel rotates, a predetermined amount of food can be rotated with each scratch detection inside the receptacle. Once the receptacle rotates to the aperture (e.g., an opening) of the food dispensing device 108, the food can be deposited and the wheel can continue to rotate as the cat scratches the scratch pad 110. Of note, by providing a wheel structure, food can be metered via the receptacles 134 and a predetermined number of scratch detections corresponding to a number of scratches before the food is dispensed.

In a typical implementation, the animal scratching post 100 can be implemented to train an animal to scratch the scratching post 100. When an animal interacts with one of the scratching pads 110, and thus activates the activation module 106, the control module 104 can then determine if food should be dispensed to the animal. Of note, the control module 104 can be configured to distribute food via the food dispensing device 108 based on or more parameters selected by a user. As previously mentioned, the control module 104 can be configured to distribute food based on an animal scratching one of the scratch pads 110 multiple times within a predefined amount of time. In another instance, the control module 104 can be configured to distribute food based on an animal scratching one of the scratch pads 110 and then waiting a predefined amount of time before distributing food. For example, the control module 104 can send a signal to the food dispensing device 108 a first time one of the scratch pads 110 are scratched and then not distribute food for 40 minutes regardless of how many times the animal scratches one of the scratch pads 110. As can be appreciated, a user can set the parameter of how long to wait before food will be dispensed again. This can help ensure that an animal is not continuously provided food.

Figure 4:
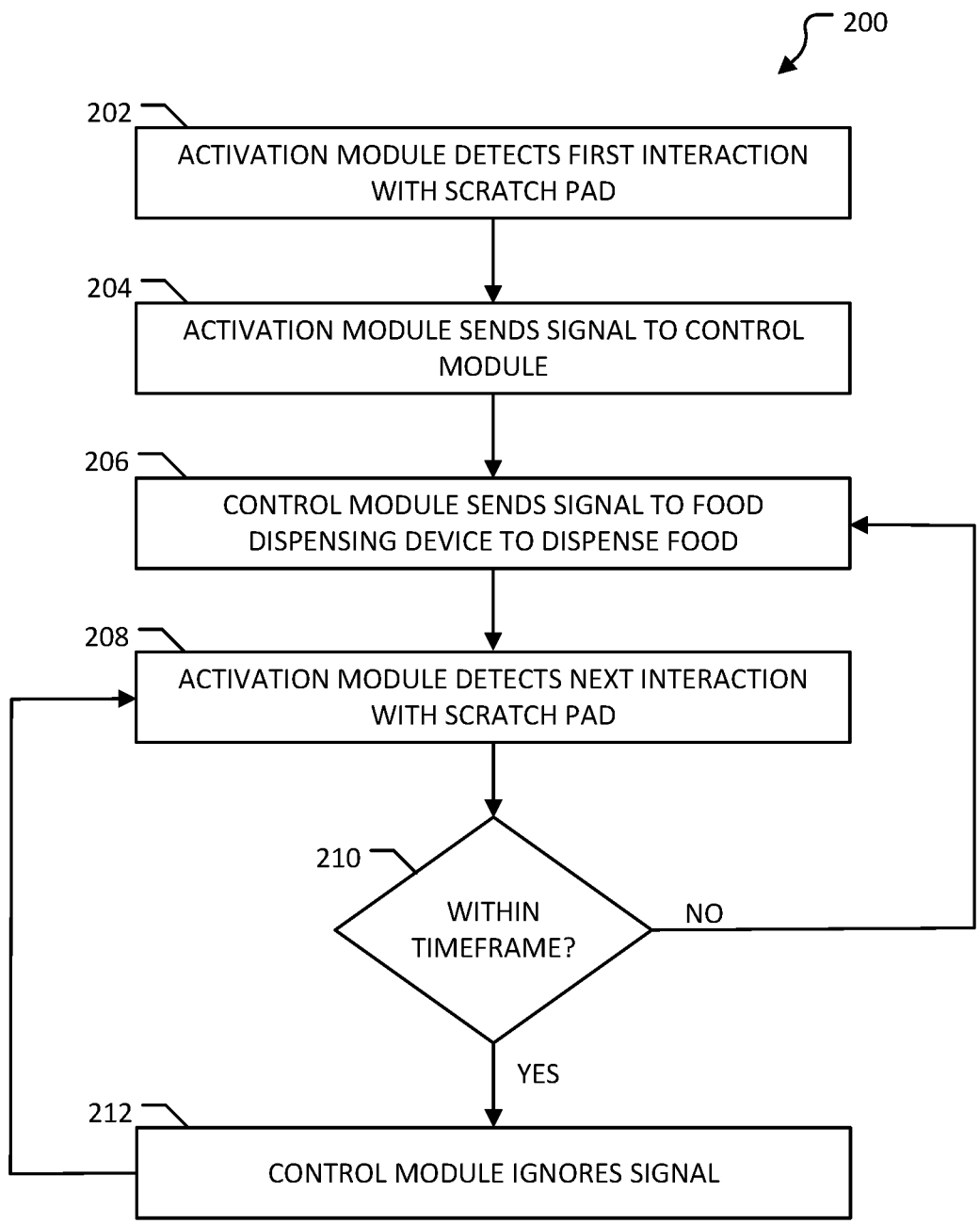
FIG. 4 is a flow diagram of a first process for implementing an animal scratching post according to one embodiment of the present invention.

Referring to FIG. 4, a flow diagram of a first process (or method) 200 for determining when the animal scratching post 100 dispenses food to an animal is illustrated. The first process 200 can be implemented to reward an animal with food based on the animal interacting with the animal scratching post 100 and limiting an amount of food based on predetermined time frames.

In block 202, the activation module 106 can detect a first interaction with one of the scratch pads 110. Of note, depending on the type of sensor implemented as the activation module 106, the means for detecting a first interaction can vary. After the activation module 106 detects a first interaction with one of the scratch pads 110, the process 200 can move to block 204.

In block 204, the activation module 106 can send a signal to the control module 104 in response to detecting a first interaction with one of the scratch pads 110.

In block 206, the control module 104 can send a signal to the food dispensing device 108 in response to receiving the signal from the activation module 106. The food dispensing device 108 can dispense food to the animal based on receiving the signal from the control module 104.

In block 208, the activation module 106 can detect a next interaction with one of the scratch pads 110 and send a signal to the control module 104.

After detecting the next interaction, the process 200 can move to decision block 210. In decision block 210, the control module 104 can determine if the next detection was within a predetermined amount of time from the first detection. If the next detection was not within the predetermined amount of time, the process 200 can move back to block 206. When the next detection is determined to be past the predetermined amount of time, said next detection can be treated as a first detection and the predetermined amount of time can be started again. As such, the animal can be rewarded again with food by the animal scratching post 100. As can be appreciated, this can help ensure that an animal is not continuously provided food by the animal scratching post 100 and can limit the amount of food provided based on a predetermined time frame.

If the next detection was within the predetermined amount of time, then the process 200 can move to block 212. In block 212, the control module 104 can ignore the signal from the activation module 106 and not send a signal to the food dispensing device 108 to dispense food. The process 200 can then move back to block 208. Since the next detection was within the predetermined amount of time, the animal scratching post 100 will not reward the animal with food. As can be appreciated, the control module 104 can be adapted to ignore successive signals from the activation module 106 for a predetermined amount of time.

Figure 5:
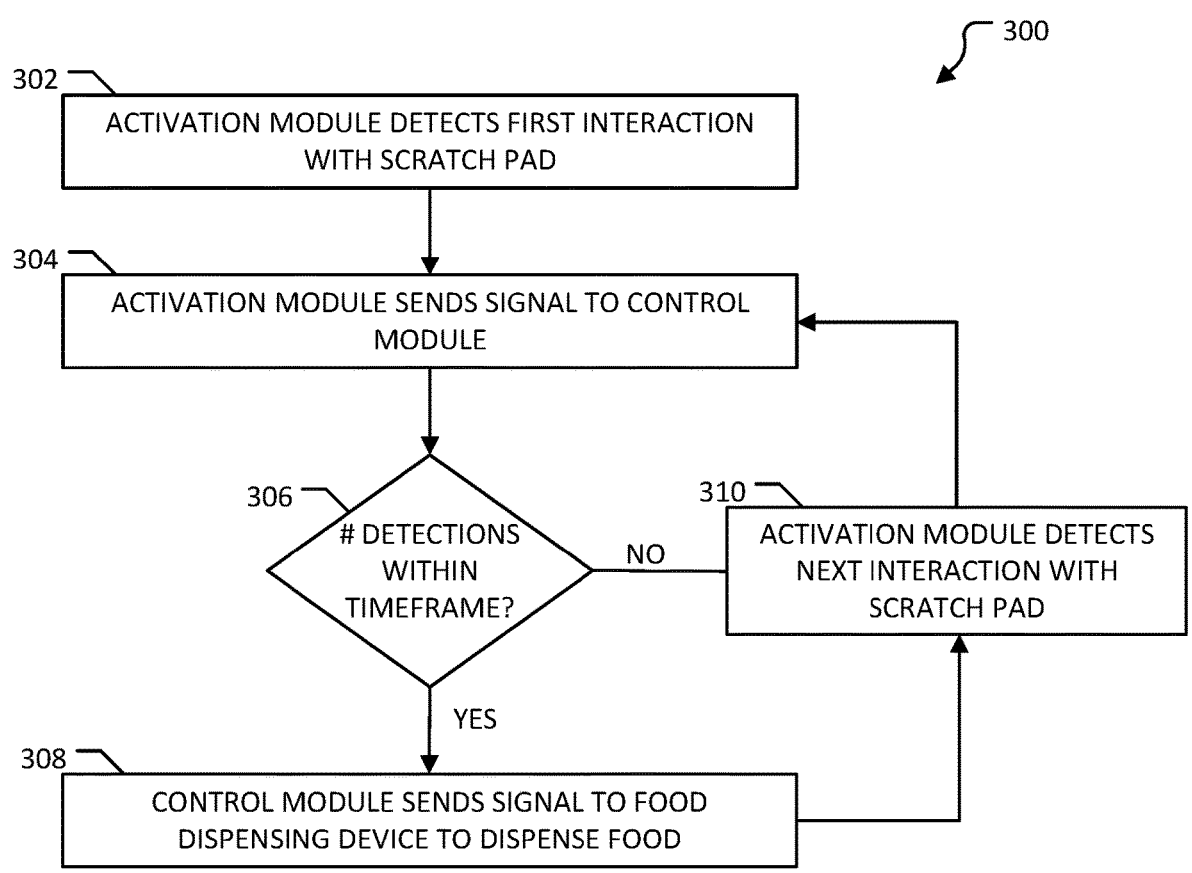
FIG. 5 is a flow diagram of a second process for implementing an animal scratching post according to one embodiment of the present invention.

Referring to FIG. 5, a flow diagram of a second process (or method) 300 for determining when the animal scratching post 100 dispenses food to an animal is illustrated. The second process 300 can be implemented to reward an animal with food from the animal scratching post 100 based on the animal interacting with the scratch pads 110 a plurality of times within a predetermined amount of time.

In block 302, the activation module 106 can detect a first interaction with one of the scratch pads 110. Of note, depending on the type of sensor implemented as the activation module 106, the means for detecting a first interaction can vary. After the activation module 106 detects a first interaction with one of the scratch pads 110, the process 300 can move to block 304.

In block 304, the activation module 106 can send a signal to the control module 104 in response to detecting a first interaction with one of the scratch pads 110. The process 300 can then move to decision block 306.

In decision block 306, the control module 104 can determine if a predetermined number of interactions by the animal has been detected within a predetermined amount of time. If the number of interactions have been detected within the predetermined amount of time, the process 300 can move to block 308. If the number of interactions have not been detected within the predetermined amount of time, the process 300 can move to block 310.

In block 308, the control module 308 can send a signal to the food dispensing device to dispense food to the animal. The process 300 can then move to block 310.

In block 310, the activation module 106 can detect the next interaction with one of the scratch pads 110. Once the activation module 106 detects the next interaction, the process 300 can move to block 304.

Generally, the control module 104 can be configured to receive signals from the activation module 106 and can determine if a predetermined number of interactions have been detected within a predetermined amount of time. For example, the control module 104 can be configured to determine if 5 interactions have been detected within 15 seconds. If the control module 104 determines those parameters have been met, then the control module 104 can send a signal to the food dispensing device to dispense food. Of note, as long as the animal interacts with the scratching pads and meets the parameters, the animal can be rewarded with food. A user can adjust the parameters (e.g., increase/decrease number of interactions and increase/decrease time frame) used by the control module 104 to make the determination on whether to reward the animal or not.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

We claim:

1. An animal scratching post comprising:
   a base structure, the base structure including:
      a base;
      a post extending up from the base, a first end of the post coupled to the base; and
      a pair of scratch pads coupled to an exterior of the post;
   an activation module operatively connected to the pair of scratch pads;
   a food dispensing device connected with the base structure; and
   a control module configured to determine when the food dispensing device should activate the food dispensing device to dispense a treat as a reward for using at least one of the pair of scratch pads based on signals received from the activation module, wherein the activation module includes at least one sensor, and wherein the activation module sends a signal to the control module in response to the at least one sensor detecting an animal scratching the at least one of the pair of scratch pads.

2. The animal scratching post of claim 1, wherein the control module only activates the motor assembly after receiving a predetermined number of signals from the activation module within a predetermined amount of time.

3. The animal scratching post of claim 1, wherein the control module activates the motor assembly after receiving a first signal from the activation module, the control module configured to ignore successive signals from the activation module for a predetermined amount of time.

4. The animal scratching post of claim 1, wherein the activation module is a pressure sensor.

5. The animal scratching post of claim 1, wherein the activation module is a momentary switch.

6. The animal scratching post of claim 1, wherein the food dispensing device includes a motor assembly, said control module being operatively connected to the motor assembly and configured to activate the motor assembly in dispensing the treat.

7. The animal scratching post of claim 6, wherein the dispensing device further comprises a plurality of receptacles for retaining treats, with the plurality of receptacles forming a wheel configured to be rotated by the motor assembly in dispensing the treat.

8. The animal scratching post of claim 1, wherein the food dispensing device is removably coupled to a perch located proximate a second end of the post.

9. The animal scratching post of claim 8, wherein the perch includes a pad for an animal to rest upon.

10. The animal scratching post of claim 8, wherein the food dispensing device is magnetically coupled to a bottom side of the perch.

11. An animal scratching post comprising:
a food dispensing device;
an activation module;
a control module operatively connected to the food dispensing device and the activation module; and
a base structure including a base, a post, and a pair of scratch pads located proximate an exterior of the post;
wherein the control module is adapted to activate the food dispensing device to dispense food after receiving a first signal from the activation module, and ignore successive signals from the activation module for a predetermined amount of time, and
wherein the activation module includes (i) a first sensor operatively coupled to a first scratch pad of the pair of scratch pads, and (ii) a second sensor operatively coupled to a second scratch pad of the pair of scratch pads.

12. The animal scratching post of claim 11, wherein the activation module sends a signal to the control module based on the first sensor detecting the first scratch pad being interacted with by an animal.

13. The animal scratching post of claim 11, wherein the activation module sends a signal to the control module based on the second sensor detecting the second scratch pad being interacted with by an animal.

14. An animal scratching post comprising:
a base structure including a base, a post, and a pair of scratch pads;
a food dispensing device, the food dispensing device defined by:
a mounting plate including an aperture, a plurality of protrusions, and a coupling mechanism;
a motor assembly; and
a plurality of receptacles forming a wheel, the wheel operatively connected to the motor assembly and adapted to pass over the aperture; an activation module, the activation module including:
a first sensor operatively coupled to a first scratch pad of the pair of scratch pads; and
a second sensor operatively coupled to a second scratch pad of the pair of scratch pads;
a control module operatively connected to the food dispensing device and the activation module;
wherein (i) the activation module is configured to send a signal to the control module based on the first sensor detecting the first scratch pad being interacted with by an animal or the second sensor detecting the second scratch pad being interacted with by the animal; and (ii) the control module is configured to activate the food dispensing device to dispense food after receiving a first signal from the activation module, and ignore successive signals from the activation module for a predetermined amount of time.

* * * * *